US006981512B2

(12) United States Patent
Meyer

(10) Patent No.: US 6,981,512 B2
(45) Date of Patent: Jan. 3, 2006

(54) TUBULAR FLOW CONDUIT WITH IN-LINE INTEGRATED CHECK VALVE AND METHOD OF MAKING SAME

(75) Inventor: David L. Meyer, Archbold, OH (US)

(73) Assignee: Dana Corporation, Toledo, OH (US)

( * ) Notice: Subject to any disclaimer, the term of this patent is extended or adjusted under 35 U.S.C. 154(b) by 189 days.

(21) Appl. No.: 10/643,705

(22) Filed: Aug. 19, 2003

(65) Prior Publication Data
US 2005/0039798 A1    Feb. 24, 2005

(51) Int. Cl.
*F16K 15/04*    (2006.01)
*B21D 1/24*    (2006.01)
*B21D 39/20*    (2006.01)
*B21D 53/10*    (2006.01)

(52) U.S. Cl. .............................. 137/15.22; 137/15.18; 137/315.33; 137/539; 29/890.13; 29/890.132; 29/441.1

(58) Field of Classification Search ............. 137/15.18, 137/15.22, 315.33, 539; 29/890.13, 890.132, 29/890.122, 441.1; 72/370.01–370.08
See application file for complete search history.

(56) References Cited

U.S. PATENT DOCUMENTS

| | | | |
|---|---|---|---|
| 2,137,402 A | | 11/1938 | Hoferer et al. |
| 2,679,903 A | * | 6/1954 | McGowen Jr. et al. ..... 417/109 |
| 3,387,625 A | | 6/1968 | Laure |
| 3,725,990 A | * | 4/1973 | Petersen et al. ........ 29/890.122 |
| 3,830,258 A | | 8/1974 | Leach |
| 4,059,881 A | * | 11/1977 | Sliger ..................... 29/890.122 |
| 4,295,412 A | * | 10/1981 | Hachiro ....................... 91/468 |
| 4,611,374 A | | 9/1986 | Schnelle et al. |
| 4,641,405 A | * | 2/1987 | Green et al. ........... 29/890.122 |
| 4,681,559 A | | 7/1987 | Hooven |
| 5,392,516 A | * | 2/1995 | Mazhar .................... 29/890.13 |
| 5,582,204 A | * | 12/1996 | Hiranuma et al. ........... 137/539 |
| 5,649,360 A | * | 7/1997 | Schwarz ................... 29/890.13 |
| 5,799,689 A | | 9/1998 | Tang et al. |

FOREIGN PATENT DOCUMENTS

JP             01133634 A    *    5/1989

* cited by examiner

*Primary Examiner*—Ramesh Krishnamurthy
(74) *Attorney, Agent, or Firm*—Reising, Ethington, Barnes, Kisselle, P.C.

(57) ABSTRACT

An integrated in-line tube and check valve assembly fabricated by end-form mandrel expanding an outlet end portion of deformable tube stock, such as metal, of nominal starting diameter, and concurrently end-forming a valve seat on the inside of the expanded tube section where it necks down and integrally joins the upstream nominal diameter portion of the tube. A valve ball and a valve spring are then fitted into the expanded tube section, together with a spring holder if needed. The expanded end portion of the tube is then again deformed by an end-form swaging operation that reduces the diameter of the expanded tube outlet end so as to form a cavity within the tube in which the spring is captured in compression for resiliently biasing the valve ball against the valve seat.

15 Claims, 2 Drawing Sheets

TUBULAR FLOW CONDUIT WITH IN-LINE INTEGRATED CHECK VALVE AND METHOD OF MAKING SAME

BACKGROUND OF THE INVENTION

This invention relates to a check valve formed integrally with a tubular flow conduit and a method of manufacturing the same, as distinguished from securing a separate check valve assembly to the flow conduit.

In many applications it is desirable to incorporate a check valve in a fluid flow conduit or line to prevent fluid from flowing in one direction while allowing fluid to flow in the other direction. In certain of those prior applications a check valve has been integrated directly in the fluid line, thereby avoiding the necessity of using self-contained separate valve assemblies that must be joined in an appropriate manner to the tubing or pipe system. In such integrated applications, cost savings have been realized by using the tubing itself as the casing or body portion of the check valve assembly that is thus integrated with the tube. Such integrated check valve assemblies also eliminate leakage points from seals because they avoid breaking the continuity of the tubing.

Prior examples of integrating a check valve into a length of tubing stock are disclosed in the expired U.S. Pat. No. 3,387,625 Laure and in the expired U.S. Pat. No. 4,611,374 Schnelle et al. Both of these prior art patents incorporate a ball-type check valve in a flow conduit made of material that is capable of being shaped or worked. The integral valve cage or chamber as well as valve seat thus are formed by reducing the diameter of the tubing at two spaced points to thereby form both ends of the valve cage. One end is thus necked down to serve as the valve seat for the ball. The other end is likewise necked down to serve as a retainer either for a valve spring assembled in the valve cage (Laure '625), or for a valve-ball-retainer comprising a series of circumferentially spaced inwardly extending ball-retaining indentations that hold the ball from release from the cage, while allowing fluid flow around the ball through the tube (Schnelle et al '374).

While the aforementioned integrated in-line check valve and flow tube assemblies provide the aforestated advantages of avoiding assembling a separate check valve assembly to the tube, they are disadvantageous from the standpoint of requiring the nominal tube diameter to be reduced by the necking down operation both upstream and downstream of the ball valve element of the check valve, thereby reducing the fluid flow capacity of the tubular flow line.

SUMMARY OF THE INVENTION

In general, and by way of summary description and not by way of limitation, the present invention provides an improved in-line integrated tube and check valve assembly that comprises a fluid-flow conduit in the form of an elongated hollow tube having a linear end section open at one axial end to serve as a fluid flow outlet of the tube. The tube has a check valve element, preferably in the form of a ball, captured in an enlarged valve cavity integrally formed in the end section of the tube and axially spaced from the open outlet end of the tube. The tube has a nominal constant diameter upstream of the check valve cavity, and the tube wall forming the enlarged cavity has a cross sectional dimension greater than this nominal tube diameter. The tube cavity wall forms a valve seat at the upstream end of the valve cavity. Preferably a valve spring is also captured in compression in the cavity and lightly resiliently biases the valve element against the integrated valve seat.

The invention also provides an improved method of assembling the check valve element into the tube of deformable material. First the outlet and contiguous end portion of the tube are expanded by an end forming, cold working operation for a given axial length. The valve seat is formed within the tube end portion as it is being so end-form expanded, the valve seat being located where the expanded end portion integrally joins the unexpanded upstream portion of the tube that remains at the nominal diameter. Then a valve element and valve spring are inserted via the tube outlet and positioned within the expanded end portion of the tube with the valve element seated against the valve seat. Then the expanded tube outlet end portion is again deformed, but this time by an end-form swaging operation that reduces its diameter from the outlet up to a given location downstream of the valve spring to thereby form a valve cavity with a transition stop-shoulder wall that captures the spring within the valve cavity and in compression for lightly biasing the valve element against the valve seat. Preferably the tube outlet end portion is thus swage reformed back to the nominal diameter of the tube. In addition, the reformed tube end portion may be further end-form cold worked to form upset hose stop and sealing beads, compression flare configurations or other attachment configurations in the reformed tube geometry as desired for coupling the outlet end portion of the tube to flow line continuation structure.

BRIEF DESCRIPTION OF THE DRAWINGS

FIGS. 1 through 2F are each part elevational, part center-sectional fragmentary views, FIG. 1 showing an outlet end portion of tubular conduit stock illustrating an exemplary but preferred embodiment of the invention in finished form.

FIG. 2F is a view illustrating the removal of the positioning tool from the tubular stock to thereby allow the large end of the biasing spring to seat against the stop shoulder formed in the valve cavity.

DETAILED DESCRIPTION OF THE PREFERRED EMBODIMENT

Figure 1:
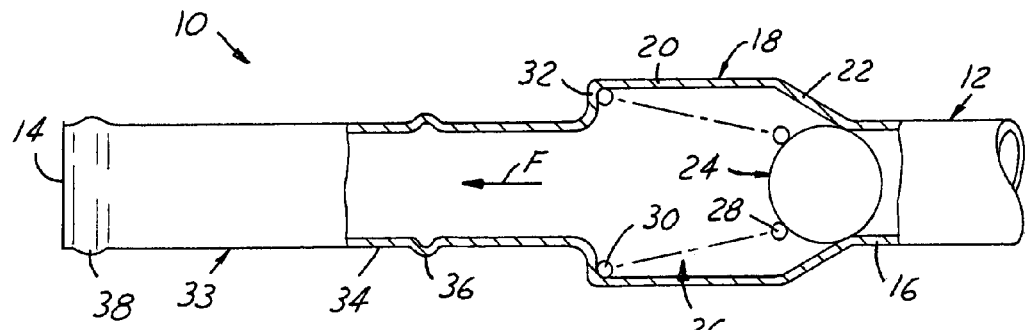

Referring in more detail to the accompanying drawings, FIG. 1 illustrates a preferred but exemplary embodiment of an in-line integrated tube and check valve assembly 10 of the invention. Assembly 10 comprises an outlet end portion 12 of an elongated hollow tube of cylindrical right-circular cross sectional configuration. End portion 12 has an upstream wall 16 of given nominal constant diameter at its upstream end and an open outlet end 14 at is downstream end. Assembly 10 thus has a constant diameter upstream tube wall 16 typically specified as a given nominal standard tubular diameter. Assembly 10 also has an integral valve casing wall 18 of right-circular cylindrical cross sectional configuration made up in part by a constant diameter cylindrical wall section 20 having a diameter preferably about 25% greater than that of tube wall 16. Valve cavity 18 also includes a conically tapering wall section 22 that is integrally joined as formed to wall 20 at its large diameter end and to wall 16 at its small diameter end. Wall 22 is thus well adapted to serve as a valve seat for a check valve element, preferably in the form of a valve ball 24, housed within valve casing 18. A compression coil spring 26 is also received within valve casing 28 and has a tapering cross section with its small diameter end convolution 28 engaging ball 24 and the larger diameter end convolution 30 engaging an annular stop in the form of a retaining shoulder wall portion 32 that joins cavity wall portion 20 to a downstream reduced diameter outlet end portion 33 of conduit 12. Wall 34 of downstream outlet end portion 33 preferably has an internal diameter no less than that of upstream wall 16.

The normal direction of flow of fluid through assembly 10 is indicated by the arrow F in FIG. 1. Normal fluid flow pressure acting against check ball 24 is sufficient to overcome spring bias to allow ball 24 to move to the left as viewed in FIG. 1 from the closed position shown in FIG. 1 to an open position within valve casing 18. Check ball 24 thus operates as a typical one-way check valve in the flow line of conduit tube 12, with positive seating being provided by spring 26 lightly forcing ball 24 against the internal valve seat (close to the junction of wall sections 22 and 16) to thereby reliably prevent reverse fluid flow in conduit 12.

As shown only in FIG. 1, the tube and check valve assembly 10 may have additional end-formed cold worked sections, such as the pair of hose bumps 36 and 38 that assist in positioning and sealing an encircling flexible hose (not shown) inserted over the outlet end 14 of tube section and retained thereon by a conventional crimp collar.

The preferred embodiment of the method of the invention for assembling check valve ball 24 into tube 12 of deformable material is illustrated in sequence in the forming and assembly steps illustrated in FIGS. 2A, 2B, 2C, 2D, 2E and 2F respectively.

Figure 2A:
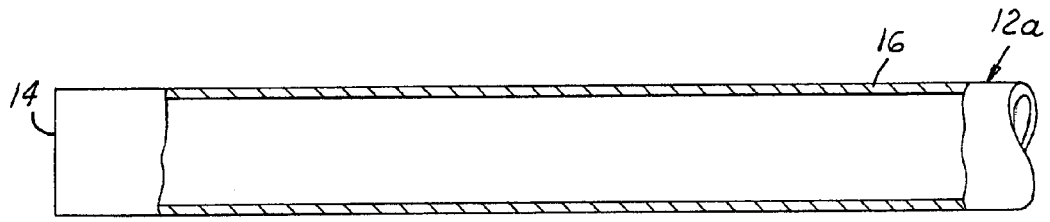
FIG. 2A is a view of the outlet end portion of the tube stock cylindrical (right circular) starting material of constant nominal diameter.

Tube end portion 12 is shown in FIG. 2A as a preform 12a, i.e., in its initial, starting material state, and preferably is made of deformable metallic material such as low carbon steel, stainless steel, aluminum or brass, and thus is capable of permanent deformation by conventional cold working end forming machines and equipment. The starting material 12a is shown in FIG. 2A preferably as a predetermined length of linear tubing 12 having a right-circular cylindrical wall 16 of constant diameter and uniform radial thickness and thereby defining the end portion conduit 12a that terminates in an axially open outlet end 14.

In the first forming step of the method, the end portion wall 16 is radially expanded to form an intermediate portion 40 extending a given length upstream from outlet end 14 and having a diameter larger than that of wall 16 and integrally joined to wall 16 by a conical portion 42 having a taper angle less than that of wall 22. This expansion stage is preferably performed by a conventional end-forming head expansion tooling and technique (not shown). Typically in this process tube 12a is put in a segmented die that clamps portion 16 upstream of the region for forming wall 22 and has an internal cavity profile matching that of tube wall 40 and conical intermediate wall 42. An expanding mandrel tool is forced endwise axially into the open end 14 of tube wall 16, and has a shape and diameter suitable to cold work expand wall 16 out to the diameter of wall 40 shown in FIG. 2B, and also to form the conical wall transition 42.

Figure 2B:
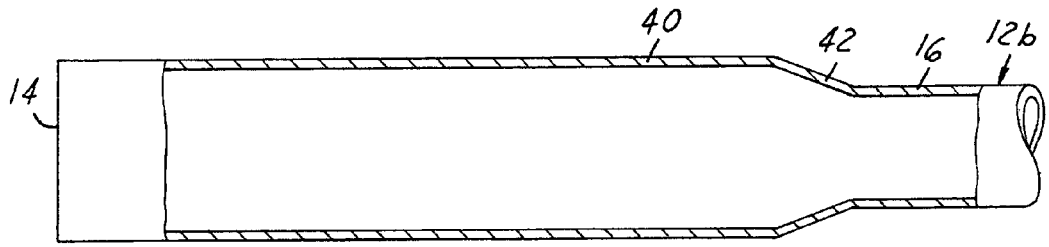
FIG. 2B is a view of the tubular stock after completion of a first stage end-forming expansion operation.
Figure 2C:
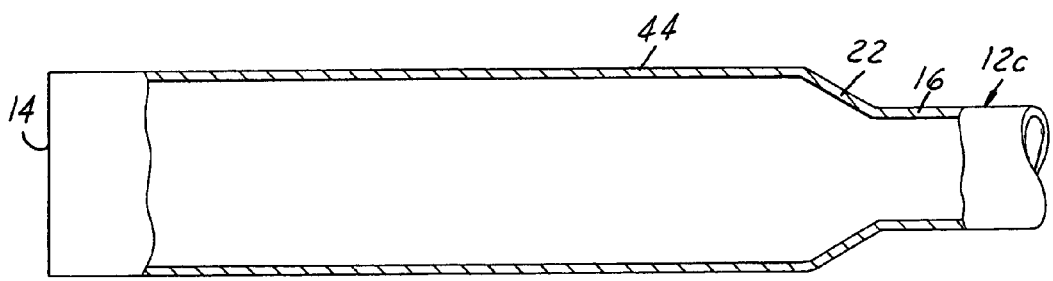
FIG. 2C is a view of the tubular stock after a second stage end-forming expansion operation.

In the next stage of the method illustrated in the progression from FIG. 2B to FIG. 2C, the end forming process is repeated by re-chucking the intermediate workpiece 12b from FIG. 2B into an end forming machine having the proper end form tooling and sizing to end form portion 40 to a larger diameter to form the expanded end portion length 44 of constant diameter extending axially from end 14 up to the reformed conical cavity transition wall, now having a steeper taper and being designated as finished wall 22 in FIG. 2C. Wall 44 preferably has a diameter approximately 25% greater, and may be up to 50% greater, than the original diameter of wall 16 of preform 12a, and is formed to the same diameter as the finished cavity wall 20 of the assembly 10 described hereinabove.

Figure 2D:
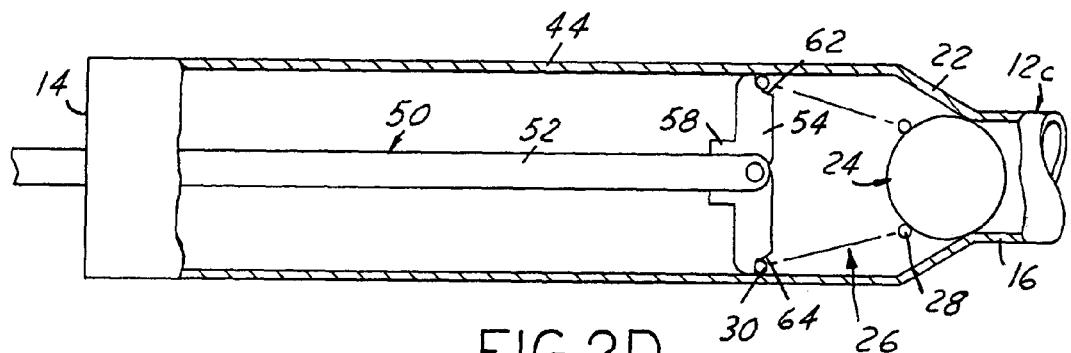
FIG. 2D illustrates the step of positioning a check ball and associated biasing spring into the expanded tube stock of FIG. 2C with an appropriate assembly tool inserted axially into the open outlet end of the tube stock.

In the next step of the method, illustrated in FIG. 2D, the sub-assembly of valve ball 24 and biasing coil spring 26 are inserted via open outlet 14 and positioned within said expanded end portion 44 with check ball 24 seated against the internal valve seat formed at the junction of conical section 22 and tube wall 16. Preferably this positioning step is performed with the aid of a customized assembly tool 50 that includes an elongated shank 52 dimensioned so as to protrude out of the outlet end 14 when positioned as shown in FIG. 2D. Tool 50 carries at its working end a pair of L-shaped pusher fingers 54 and 56 each having a stop foot 58 and 60 respectively that abut shank 52 when fingers 54 and 56 are pivoted out to extend perpendicular to shank 52 as shown in FIG. 2D. The outer ends of fingers 54 and 56 are respectively notched at 62 and 64 to seat fingers 54 and 56 within the end coil 30 of spring 26 in secure pushing relation on the spring. The initial assembly position of tool 50 and associated fingers 54 and 56 relative to the check ball 24 in its seated position is such as to slightly compress spring 26 and to thereby hold fingers 54 and 56 spaced a given distance from conical wall section 22. Tool 50 is then suitably fixtured so as to be held in the position of FIG. 2D during the performance of the next end-forming step of the method.

Figure 2E:
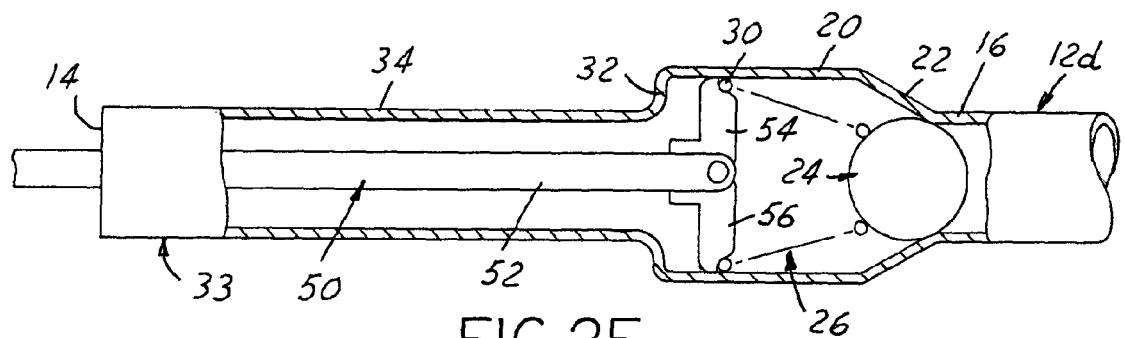
FIG. 2E illustrates the tubular stock after the diameter of the end portion of the tube has been end-form swaged back to nominal diameter downstream of the valve cavity, thereby forming the downstream end of the cavity as an annular shoulder for holding the larger end of the valve spring.

In this next step of the method, illustrated by the transition from the form of FIG. 2D to the form of FIG. 2E, the downstream end portion 44 of tubular stock is again deformed, but by a conventional cold working swaging operation, designed to permanently deform and thereby reduce the diameter of an outlet end portion 33 of expanded wall 44 that now extends from the outlet 14 to a location axially along portion 44 that is appropriate to form the spring stop wall 32 at the junction of casing wall 20 and the newly shrunken tube wall 34 of end portion 33. The reduction of expanded tubing section 44 down to the reduced diameter tubing section 34 is preferably performed in a conventional swaging machine (not shown) that has a suitable cavity formed in die blocks. The tubing is forced endwise (axially) back down into this die cavity to cold work the same and thereby shrink the diameter of the tubing down to section 34. Preferably wall 34 is of circular cross section and of a constant diameter and generally equal to that of upstream portion 16 of end portion 12.

Figure 2F:
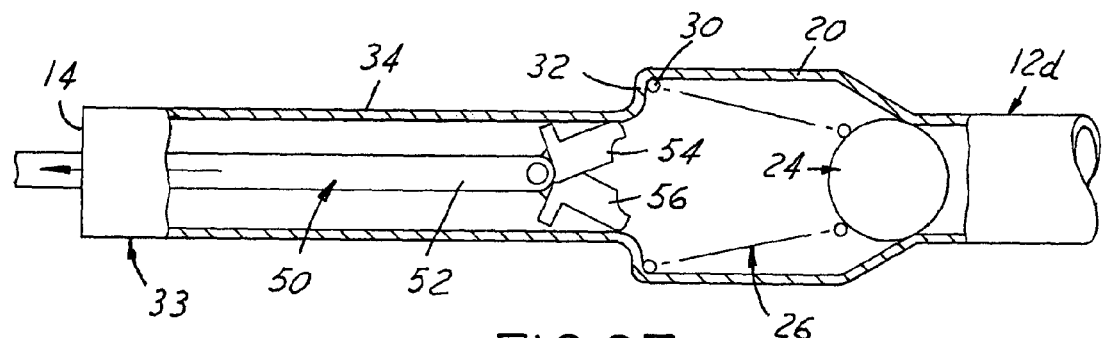

In the next step of the method illustrated by the sequence of progression from FIG. 2E to FIG. 2F, tool 50 is retracted by withdrawing it (to the left as viewed in FIG. 2F) toward tube outlet 14. As fingers 54 strike stop wall 32 during this initial retraction motion, they are pivoted inwardly toward one another to the collapsed finger position of FIG. 2F. In this condition the overall outside diameter of the collapsed fingers is slightly less than the inside diameter of tube portion 34 to thereby permit retraction of the fingers and removal of tool 50 completely out from the finished integrated check valve and tube assembly shown in FIG. 2F. Also, during this initial retraction, end convolution 30 of spring 26 is carried back until it is released from the collapsing fingers and thus seats against stop wall 32, as shown in FIG. 2F.

The integrated tube and check valve assembly 10 of FIG. 2F may be further worked from its form in FIG. 2F to that shown in FIG. 1 wherein conventional hose bumps 36 and 38 have been formed by typical end upset operations in a conventional tube upset forming machine. It will also be understood that other finishing operations may be performed on the configuration of the assembly of FIG. 2F, such as forming a compression flare on outlet end 14 or other conventional structure to facilitate coupling to downstream conduit flow structures other than hoses or plastic tubing.

From the foregoing description it will now be seen that the method and apparatus of the invention provide many advantages over the prior art, including eliminating a separate drainback valve subassembly component that must be attached by fittings and seals to an outlet end of a tube, this part being eliminated by end forming the valve shell directly into the tube. Moreover, unlike the aforementioned prior art patents discussed above, the flow diameter of tube 12 need never be reduced smaller than the nominal diameter of wall 16. Hence fluid flow through the integrated check ball assembly is not restricted by diametrical reductions in the tubing diameter. Also, check ball 24 operates in an enlarged diameter valve casing 18 so that the cross sectional flow area around valve ball 24 when open can be equal to the cross sectional flow area of wall section 16, or nearly so. Hence, fluid flow is not hampered by ball 24 operating in a constricted diameter tubing section as in the prior art.

The conical form of biasing spring 26, with its largest diameter abutting stop wall 32 and coil 30, provides a stabilized biasing arrangement for valve ball 24 even though operably "floating" as it opens into the large diameter cavity provided by valve casing wall 20. The swaging operation utilized to form tubing portion 34 in FIGS. 2E and 2F is preferably designed to make portion 34 long enough between outlet 14 and valve casing 18 to accommodate another attachment end form operation, such as the hose bead bumps 36, 38, or a suitable compression flare forming operation. The invention thus accomplishes these additional advantages as well as incorporating the advantages set forth above with respect to the Laure '625 patent and Schnelle et al. '374 patent.

Note also that the invention preferably integrates the check valve assembly into a linear tubular outlet end portion of the fluid flow conduit line. Therefore, conventional mass-production, high efficiency end-forming machines can be advantageously utilized to perform all of the cold working permanent deformation operations required to form the improved in-line integrated tube and check valve assembly 10 of the invention.

What is claimed is:

1. A method of assembling a check valve into a tube of deformable material, which comprises:
    (a) expanding an end portion of said tube,
    (b) forming a valve seat within said end portion expanded in said step (a) where the expanded end portion joins the remainder of the tube,
    (c) positioning a valve element within said expanded end portion with said element seated against said seat, and
    (d) deforming said end portion by reducing the diameter of a portion of said end portion to form a valve casing cavity operable to capture said valve element within said tube for operably opening and closing against said seat by movement of said valve element in said cavity.

2. The method set forth in claim 1 that includes the step, prior to said step (a), of providing said tube having said end portion of uniform wall thickness.

3. The method of claim 2 wherein the step (a) of expanding the end portion of the tube is performed by head forming expansion apparatus having an expanding mandrel operable to be inserted endwise into the open outlet end of the tube.

4. The method of claim 2 wherein step (c) includes providing an installation tool having a shank and fold out fingers to operably force the valve element against the valve seat, such fingers having feet that hold the fingers in an expanded outward position, the fingers being pivotable to collapse the same for withdrawal from the tube after step (d) is performed.

5. The method of claim 2 wherein step (d) is performed in an end form swaging operation wherein the outlet end of the tube and a shrinking die are forced together to cold work the tubular stock back down to a final diameter.

6. The method of claim 1 wherein the final diameter formed in step (d) is no less than the diameter of the upstream nominal stock diameter of the tube starting material.

7. The method of claim 1 wherein the final expanded section of the tubing expanded in step (a) has a diameter approximately 25% greater than the nominal diameter of the starting tube material.

8. The method of claim 1 wherein the valve element comprises a check ball having a diameter only slightly larger than that of the nominal tube stock diameter of the starting material.

9. The method of claim 2 wherein step (c) also includes positioning a coil compression valve spring within said expanded end portion and engaging said valve element when said valve element is seated against said seat, and wherein step (d) also captures said valve spring within said cavity with said spring in compression holding said valve element against said seat.

10. The method of claim 9 wherein step (c) includes providing an installation tool having a shank and fold out fingers to engage an end coil of said coil compression spring and these fingers having feet that hold the fingers in an expanded outward position, and the feet are pivotable to collapse the same for withdrawal from the tube after step (d) is performed.

11. A method of assembling a check valve into a tube of deformable material, which comprises:
    (a) expanding an end portion of said tube,
    (b) forming a valve seat within said end portion expanded in said step (a) where the expanded end portion joins the remainder of the tube,
    (c) positioning a valve element within said expanded end portion with said element seated against said seat, and
    (d) deforming said end portion by reducing the diameter of a portion of said end portion to form a valve casing cavity operable to capture said valve element within said tube for operably opening and closing against said seat by movement of said valve element in said cavity,
    wherein the step (a) of expanding the end portion of the tube is performed by head forming expansion apparatus having an expanding mandrel operable to be inserted endwise into the open outlet end of the tube.

12. The method of claim 11 wherein the expansion operation is performed in two stages to progressively head form expand the end portion of the tube to a final diameter to form the casing wall of the valve cavity for the valve element.

13. A method of assembling a check valve into a tube of deformable material, which comprises:
   (a) expanding an end portion of said tube,
   (b) forming a valve seat within said end portion expanded in said step (a) where the expanded end portion joins the remainder of the tube,
   (c) positioning a valve element within said expanded end portion with said element seated against said seat, and
   (d) deforming said end portion by reducing the diameter of a portion of said end portion to form a valve casing cavity operable to capture said valve element within said tube for operably opening and closing against said seat by movement of said valve element in said cavity,
   wherein step (c) includes providing an installation tool having a shank and fold out fingers to operably force the valve element against the valve seat, such fingers having feet that hold the fingers in an expanded outward position, the fingers being pivotable to collapse the same for withdrawal from the tube after step (d) is performed.

14. A method of assembling a check valve into a tube of deformable material, which comprises:
   (a) expanding an end portion of said tube,
   (b) forming a valve seat within said end portion expanded in said step (a) where the expanded end portion joins the remainder of the tube,
   (c) positioning a valve element within said expanded end portion with said element seated against said seat, and
   (d) deforming said end portion by reducing the diameter of a portion of said end portion to form a valve casing cavity operable to capture said valve element within said tube for operably opening and closing against said seat by movement of said valve element in said cavity,
   wherein step (d) is performed in an end form swaging operation wherein the outlet end of the tube and a shrinking die are forced together to cold work the tubular stock back down to a final diameter.

15. A method of assembling a check valve into a tube of deformable material, which comprises:
   (a) expanding an end portion of said tube,
   (b) forming a valve seat within said end portion expanded in said step (a) where the expanded end portion joins the remainder of the tube,
   (c) positioning a valve element within said expanded end portion with said element seated against said seat, and
   (d) deforming said end portion by reducing the diameter of a portion of said end portion to form a valve casing cavity operable to capture said valve element within said tube for operably opening and closing against said seat by movement of said valve element in said cavity,
   wherein step (c) includes positioning a coil compression valve spring within said expanded end portion and engaging said valve element when said valve element is seated against said seat, and wherein step (d) also captures said valve spring within said cavity with said spring in compression holding said valve element against said seat, and
   wherein step (c) includes providing an installation tool having a shank and fold out fingers to engage an end coil of said coil compression spring and these fingers having feet that hold the fingers in an expanded outward position, and the feet are pivotable to collapse the same for withdrawal from the tube after step (d) is performed.

* * * * *